(12) United States Patent
Park

(10) Patent No.: US 7,445,243 B2
(45) Date of Patent: Nov. 4, 2008

(54) MOUNT STRUCTURE OF VEHICULAR SUB-FRAME

(75) Inventor: Jong-Sung Park, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 647 days.

(21) Appl. No.: 11/040,022

(22) Filed: Jan. 24, 2005

(65) Prior Publication Data
US 2005/0275604 A1    Dec. 15, 2005

(30) Foreign Application Priority Data
Jun. 9, 2004    (KR) ............ 10-2004-0042072

(51) Int. Cl.
*B62D 21/00* (2006.01)
(52) U.S. Cl. .................. 280/785; 280/124.109
(58) Field of Classification Search .......... 280/785, 280/781, 124.109, 124.1, 124.147, 124.155; 296/193.01, 193.07, 204; 29/897.2; 403/336
See application file for complete search history.

(56) References Cited

U.S. PATENT DOCUMENTS

| | | | | |
|---|---|---|---|---|
| 3,481,622 A | * | 12/1969 | Haverbeck et al. | 280/785 |
| 4,720,120 A | * | 1/1988 | Shimatani et al. | 280/124.109 |
| 5,567,005 A | * | 10/1996 | Kosuge et al. | 296/204 |
| 6,997,276 B2 | * | 2/2006 | Yoshida et al. | 180/232 |
| 7,213,873 B2 | * | 5/2007 | Murata et al. | 296/204 |
| 2006/0049603 A1 | * | 3/2006 | Katagiri et al. | 280/124.109 |

FOREIGN PATENT DOCUMENTS

| JP | 08169361 A | * | 7/1996 |
|---|---|---|---|
| KR | 10-2004-0006287 | | 1/2004 |

OTHER PUBLICATIONS

English Language Abstract of Korea 10-2004-0006287.

* cited by examiner

*Primary Examiner*—Ruth Ilan
*Assistant Examiner*—Drew J. Brown
(74) *Attorney, Agent, or Firm*—Greenblum & Bernstein, P.L.C.

(57) ABSTRACT

A structure of a mount of a vehicular sub-frame includes a main cup into which a sub-frame pipe can be pressure-fitted, an upper plate coupled to the main cup, an auxiliary cup coupled to one end of the main cup, and a lower plate coupled to the auxiliary cup.

5 Claims, 3 Drawing Sheets

MOUNT STRUCTURE OF VEHICULAR SUB-FRAME

RELATED APPLICATIONS

The present disclosure relates to subject matter contained in priority Korean Application No. 10-2004-0042072, filed on Jun. 9, 2004, which is herein expressly incorporated by reference in its entirety.

BACKGROUND OF THE INVENTION

1. Field of the Invention

The present invention relates to a structure of a mount of a vehicular sub-frame, and more particularly to a structure of a mount of a vehicular sub-frame, in which two cups are used.

2. Description of the Related Art

In general, a sub-frame called a suspension member is a part constituting a framework of a bodywork after parts for a transmission are assembled. A side member is a part for increasing a lateral rigidity of the bodywork. A conventional connection of the sub-frame and the side member is disclosed in Korean Patent Publication No. 2004-0006287.

In the disclosed document, as shown in FIG. 1, a sub-frame reinforcement panel 1 and a sub-frame support panel 2 are spaced apart from each other at a predetermined interval, and each is welded on its one end. A lower end sided periphery of the sub-frame reinforcement panel 1 located parallel to the sub-frame support panel 2 is overlapped and welded with a sub-frame gusset panel 3. A leading end of the sub-frame support panel 2, a leading end of the sub-frame reinforcement panel 1 and the sub-frame gusset panel 3 are each welded with a periphery of the side member 4.

A pipe nut 5 formed to have a predetermined length has one end sequentially passing through the sub-frame gusset panel 3 and the sub-frame reinforcement panel 1 which are overlapped with each other, and then a part passing through them is welded. Further, a terminal end passing through the sub-frame gusset panel 3 and the sub-frame reinforcement panel 1 is welded with the sub-frame support panel 2.

Further, sub-frame pipes 6 interposed by a bush 6a are each pressure-fitted into both ends of the sub-frame 7 facing toward a front of the bodywork. A lower end of the pipe nut 5 protruded in a downward direction of the sub-frame gusset panel 3 is inserted into the sub-frame pipe 6.

And, a sub-frame mounting bolt 8 is inserted into the sub-frame pipe 6. A leading end of the sub-frame mounting bolt 8 passes through the sub-frame pipe 6 and is screwed with the pipe nut 5. Thereby, the sub-frame 7 is connected with the side member 4 through the assembly of the sub-frame reinforcement panel 1, the sub-frame support panel 2 and the sub-frame gusset panel 3.

Here, the sub-frame 7 is composed of a main cup 7c into which the sub-frame pipe 6 is pressure-fitted, and upper and lower plates 7a and 7b which are each welded with the main cup 7c (see FIG. 2).

However, the sub-frame of the foregoing configuration has the following problems.

A depth of the main cup 7c of the sub-frame mount 7 becomes deepened, so that there is a difficulty in performing welding for coupling the upper and lower plates 7a and 7b and the main cup 7c, i.e., inserting a welding tool. Therefore, it is difficult to fabricate the sub-frame mount 7.

Further, it is impossible for a worker to perform welding at a desired position.

SUMMARY OF THE INVENTION

Therefore, the present invention is to solve the foregoing problems and/or disadvantages and to provide at least the advantages described hereinafter. Accordingly, the present invention is to provide a structure of a mount of a vehicular sub-frame capable of increasing a sectional rigidity of the sub-frame mount by reducing a formed depth of the sub-frame mount to allow a tool for welding such as a welding electrode to be easily inserted.

In order to accomplish this objective, according to an aspect of the present invention, there is provided a structure of a mount of a vehicular sub-frame, comprising a main cup into which a sub-frame pipe is pressure-fitted, an upper plate coupled to the main cup, an auxiliary cup coupled to one end of the main cup, and a lower plate coupled to the auxiliary cup.

According to this configuration, a forming depth of the sub-frame mount is reduced using the two cups, a tool for welding such as a welding electrode can be easily inserted.

Further, the two cups are used wherein the main cup is welded with the auxiliary cup having a diameter larger than that of the main cup, a width of the mount is increased, thereby increasing a sectional rigidity.

In the foregoing configuration, the auxiliary cup and the upper plate are partly subjected to area contact. In this case, the contacted part becomes wide, thereby being easily welded and firmly jointed.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Hereinafter, exemplary embodiments of the invention will be described with reference to the accompanying drawings, wherein like elements are endowed with like numbers throughout the specification, and so their detailed description will be omitted.

Figure 1:
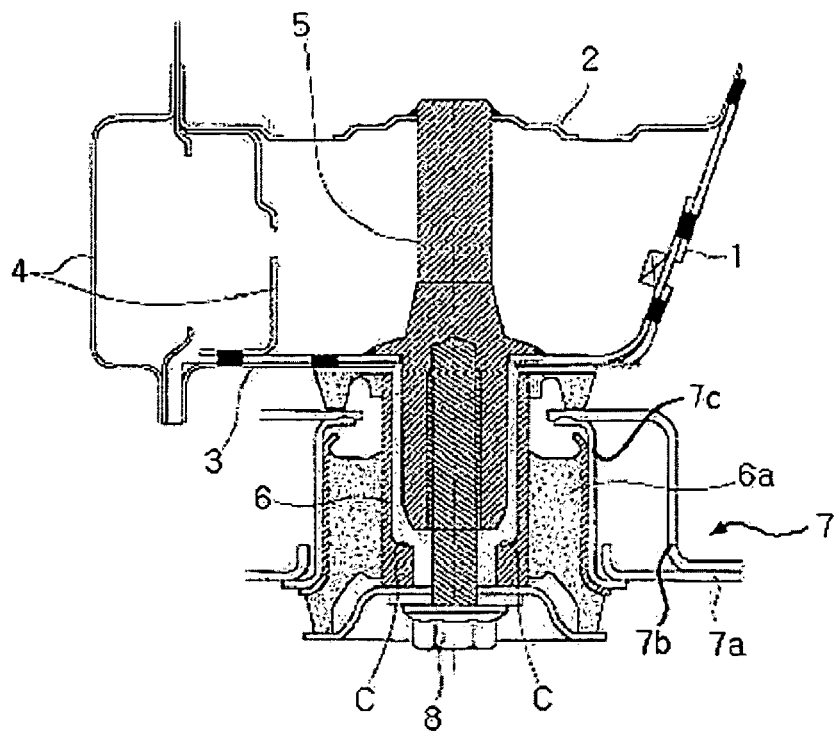
FIG. 1 is a cross-sectional view showing a connection of a conventional sub-frame and a conventional side member.
Figure 2:
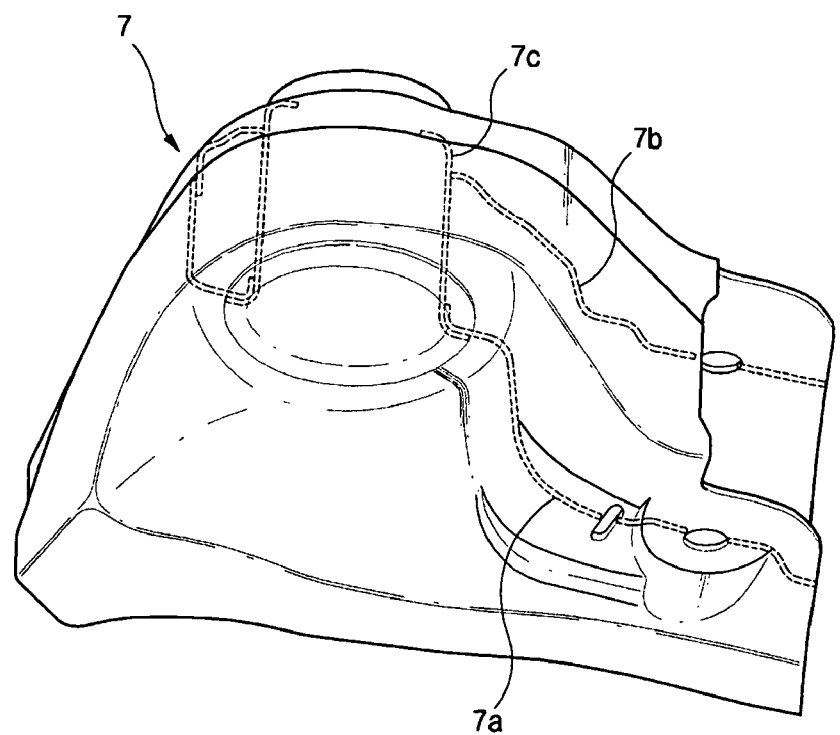
FIG. 2 is a cross-sectional view showing the sub-frame of FIG. 1.
Figure 3:
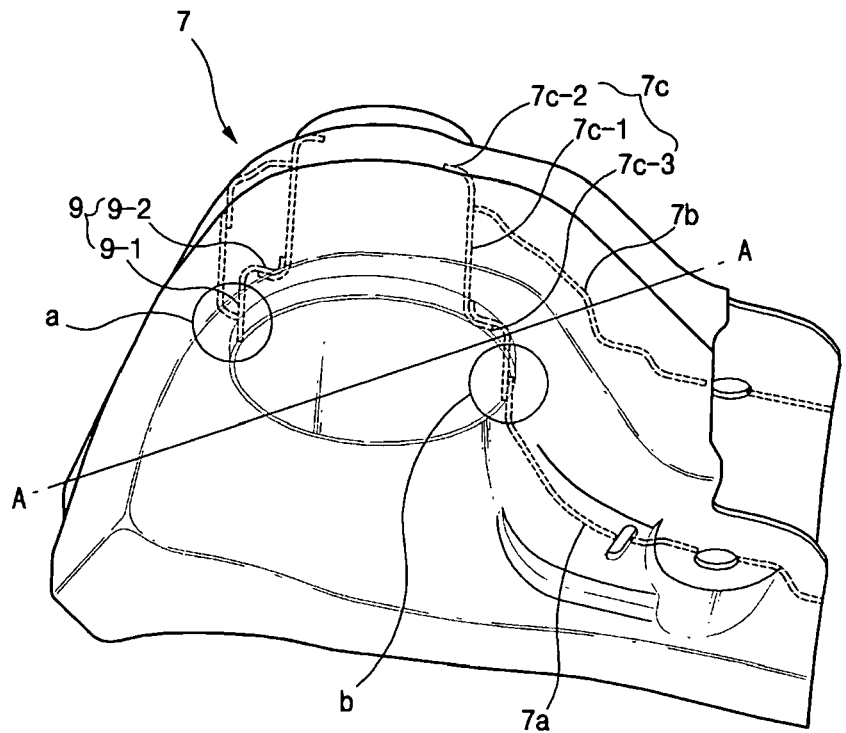
FIG. 3 is a cross-sectional view showing a structure of a mount of a vehicular sub-frame according to an exemplary embodiment of the present invention.
Figure 4:
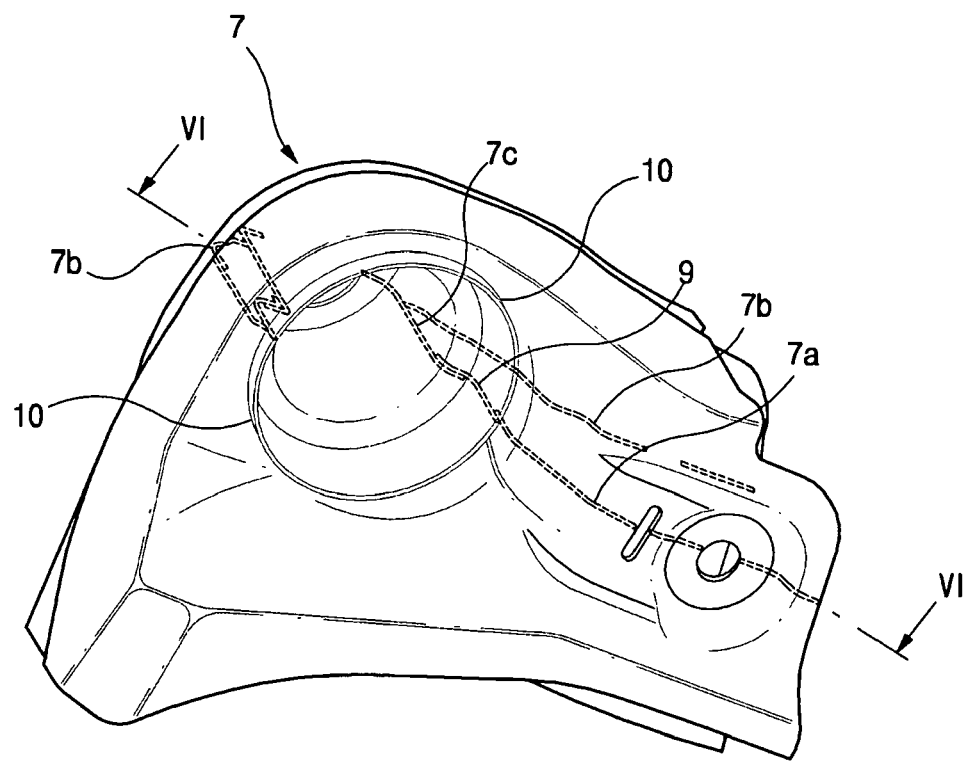
FIG. 4 is a perspective view showing the mount structure of FIG. 3.
Figure 6:
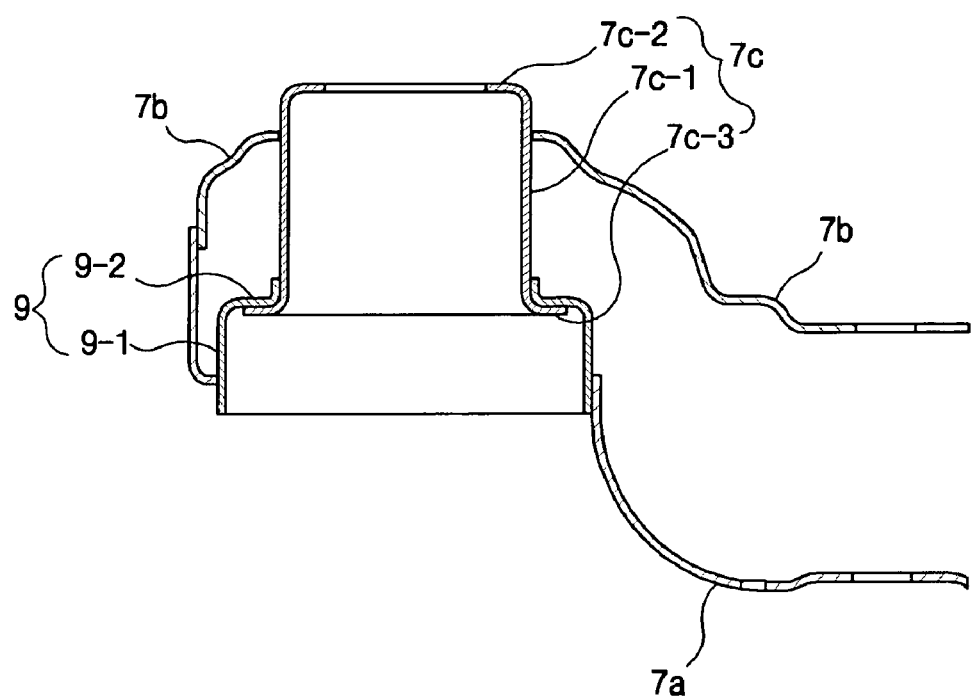
FIG. 6 is a cross-sectional view of the dotted part of FIG. 3.

FIG. 3 is a cross-sectional view showing a structure of a mount of a vehicular sub-frame according to an exemplary embodiment of the present invention, and FIG. 4 is a perspective view showing the mount structure of FIG. 3, and FIG. 6 is a cross-sectional view of the dotted part of FIG. 3.

As shown in FIGS. 3 and 4, the mount structure of the vehicular sub-frame according to the present embodiment comprises a main cup 7c into which a sub-frame pipe is pressure-fitted, an upper plate 7b coupled to the main cup 7c, an auxiliary cup 9 coupled to one end of the main cup 7c, and a lower plate 7a coupled to the auxiliary cup 9.

Figure 5:
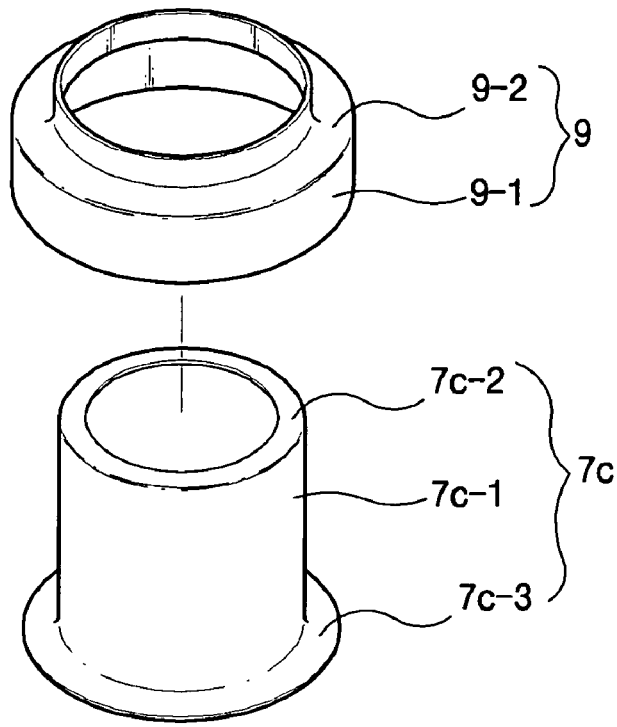
FIG. 5 is a perspective exploded view of the cup of FIG. 3.

FIG. 5 shows a detail structure of a main cup 7c and an auxiliary cup 9. The main cup 7c is comprised of a body 7c-1 taking a pipe shape, a stopper 7c-2 formed on an upper end of the body 7c-1, and a flange 7c-3 formed on a lower end of the body 7c-1.

The stopper 7c-2 is bent toward a center along a periphery of the body 7c-1, and the flange 7c-3 is bent outward along the periphery.

The body 7c-1 of the main cup 7c is housed with the sub-frame pipe (not shown) as in the prior art.

Meanwhile, the upper plate 7b is welded along the periphery of the body 7c-1 of the main cup 7c.

The auxiliary cup 9 is welded to the flange 7c-3 of the main cup 7c.

The auxiliary cup 9 is composed of a body 9-1 taking a pipe shape, and a stopper 9-2 formed on an upper end of the body 9-1.

The body 9-1 of the auxiliary cup 9 is preferably formed to have a diameter larger than that of the body 7c-1 of the main cup 7c.

The stopper 9-2 has a shape corresponding to the flange 7c-3 of the main cup 7c, and is bent toward a center along a periphery of the body 9-1 and bent upward again.

In this structure, the stopper 9-2 of the auxiliary cup 9 is welded along the periphery of the flange 7c-3 of the main cup 7c.

Meanwhile, the lower plate 7a is welded along the periphery of the body 9-1 of the auxiliary cup 9. One end of the lower plate 7a is welded with the upper plate 7b.

In this manner, when the lower plate 7a is welded along the periphery of the body 9-1 of the auxiliary cup 9, the lower plate 7a and the auxiliary cup 9 are preferably welded in a manner that parts thereof are subjected to area contact b on the basis of the line A-A, but the other parts are subjected to line contact a, as shown in FIG. 3.

In this manner, when the parts of the lower plate 7a and the auxiliary cup 9 are subjected to the surface contact b, the contacted part becomes wide, thus being easily welded and firmly jointed. When the other parts of the lower plate 7a and the auxiliary cup 9 are subjected to the line contact a, a part to be welded is small, thus being simply and inexpensively welded.

Here, a point where the area contact b of the lower plate 7a and the auxiliary cup 9 encounters the line contact a is formed with a connection 10 as shown in FIG. 4.

The connection 10 is a part where the area contact b is connected with the line contact a, and may be formed in a recess or hole shape.

In this manner, two cups, the main cup 7c and the auxiliary cup 9, allows a forming depth of the mount 7 to be reduced, so that a tool for welding such as a welding electrode can be easily inserted.

Further, the main cup 7c is welded with the auxiliary cup 9 having a diameter larger than that of the main cup 7c, a width of the mount 7 is increased, thereby increasing a sectional rigidity.

As can be seen from the foregoing, according to the mount structure of the sub-frame of the present invention has the following effects.

First, the mount structure comprises the main cup, the upper plate coupled to the main cup, the auxiliary cup coupled to one end of the main cup, and the lower plate coupled to the auxiliary cup, and the formed depth of the mount of the sub-frame is reduced using the two cups, so that the tool for welding such as the welding electrode can be readily inserted.

Second, the two cups are used, and a cup, the main cup, is welded with the other cup, the auxiliary cup, having a diameter larger than that of the main cup, the width of the mount becomes wide, thereby increasing the sectional rigidity.

Third, the parts of the lower plate and the auxiliary cup are coupled in the surface contact manner, the contacted part becomes wide, thereby being easily welded and firmly jointed.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A structure of a mount of a vehicular sub-frame, comprising:
    a main cup configured to receive a sub-frame pipe by pressure-fitting;
    an upper plate coupled to the main cup;
    an auxiliary cup coupled to one end of the main cup; and
    a lower plate coupled to the auxiliary cup,
    wherein each of the main cup and the auxiliary cup comprises a main cup space body and an auxiliary cup body, respectively, and the auxiliary cup body is configured to have a diameter larger than that of the main cup body.

2. The structure as claimed in claim 1, wherein the auxiliary cup and the lower plate are partly subjected to area contact.

3. The structure of a mount of a vehicular sub-frame according to claim 1,
    wherein the main cup comprises:
    a main cup stopper provided on an upper end of the main cup body; and
    a flange provided on a lower end of the main cup body.

4. The structure of a mount of a vehicular sub-frame according to claim 3,
    wherein the auxiliary cup comprises:
    an auxiliary cup stopper provided on an upper end of the auxiliary cup body.

5. A structure of a mount of a vehicular sub-frame, comprising:
    a main cup configured to receive a sub-frame pipe by pressure-fitting;
    an upper plate coupled to the main cup;
    an auxiliary cup coupled to one end of the main cup; and
    a lower plate coupled to the auxiliary cup,
    wherein the main cup comprises:
    a main cup body;
    a main cup stopper provided on an upper end of the main cup body; and
    a flange provided on a lower end of the main cup body,
    wherein the auxiliary cup comprises:
    an auxiliary cup body; and
    an auxiliary cup stopper provided on an upper end of the auxiliary cup body, and
    wherein the auxiliary cup body is configured to have a diameter larger than that of the main cup body.

* * * * *